Dec. 17, 1929.  P. GLAMZO  1,740,170
LEMON SLICE SQUEEZER
Filed Sept. 28, 1929

Inventor
P. Glamzo.
By his Attorney

Patented Dec. 17, 1929

1,740,170

UNITED STATES PATENT OFFICE

PAUL GLAMZO, OF NEW YORK, N. Y.

LEMON-SLICE SQUEEZER

Application filed September 28, 1929. Serial No. 395,776.

My invention relates to squeezers that are particularly designed for sliced lemons, and the object of the invention is to provide a simple and inexpensive squeezer. It is characterized by a pair of jaws yieldingly hinged to a plate which carries a pin for supporting the slice to be squeezed by the jaws.

Figure 1:
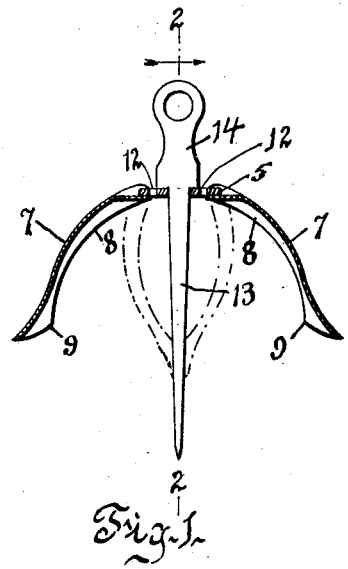
Figure 3:
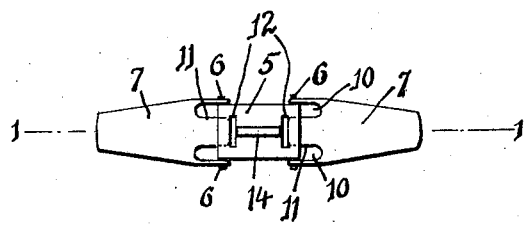

In the appended drawing forming part of this application, Figure 1 is a vertical section on line 1—1 Figure 3, of a squeezer embodying my invention.

Figure 2:
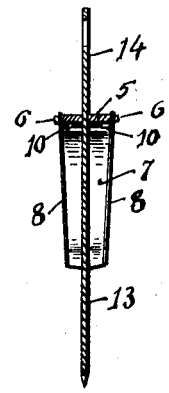

Figure 2 is a vertical section on line 2—2 Figure 1, and Figure 3 is a top plan.

Referring to the drawing, 5 is a plate preferably rectangular in shape, the longer edges of which plate are provided near the corners thereof with trunnions or pins 6, the aligning trunnions of the plate serving as pivots for the jaws 7 which are preferably U-channelled in cross-section, the webs or sides 8 of the channel 7 being wide enough at the pins 6 to engage the same, as best seen in Figure 1.

The jaws are preferably wider at the plate 5, where they are hinged, and narrower at the free end, whereat the webs or sides 8 are formed into prongs 9 to facilitate the penetration of same into a slice of lemon when engaged by the jaws.

The bottom of the channel of the jaw at the plate is cut out, as shown at 10, to form a spring 11, which bears against the plate. This spring 11 of each jaw tends to move it into the normal position as shown in Figure 2. To obtain a better action of the spring 11, the plate 5 has an aperture 12 for each spring, so that the said springs will bear against the adjacent edge of each of the apertures when the jaws are actuated by fingers in squeezing a slice.

To facilitate the holding of the slice while the same is being squeezed, the plate 5 is provided with a pin 13 extending therefrom between the jaws 7, and to facilitate the handling of the squeezer, the pin extends above the plate to form a head 14.

It is self-evident that the material from which the device is made, is unaffected by the juice of the lemon.

The slices to be squeezed are cut from the lemon subsequent to the insertion of the pin 13 into the body, the sides of the jaws serving as guiding means for making the slice from the lemon. The dash and dot line of Figure 1 shows the position of the jaws when a slice, supported by the pin, is squeezed against the resistance of the springs 11, while the jaws are moving on the hinges or pivots as previously described. The jaws are restored to their normal or open position, as shown in Figure 1, by said springs 11 when the jaws are released.

I claim:

1. A lemon slice squeezer comprising a plate, a pair of jaws hinged yieldingly on the plate and normally tending to part, and a pin extending from the plate between said jaws.

2. A lemon slice squeezer comprising a plate, a pair of jaws, each U-channelled in cross-section, hinged to the plate with the sides thereof, springs formed in the bottom of the U-channel at the plate and engaging the said plate so that normally the two jaws tend to part, said sides of said channelled jaws at the free ends thereof being shaped as prongs, and a pin extending from the plate between the jaws.

3. A lemon slice squeezer comprising a plate, a pair of jaws hinged to the plate, springs interposed between the jaws and the plate for normally parting the jaws and a pin extending from the plate between the jaws.

4. A lemon slice squeezer comprising a plate of rectangular shape, aligning trunnions on the longer edges of the plate near the corners thereof, jaws of U-channel, cross-section hinged on the trunnions of the plate with the sides of the channels, said channels near the plate having portions thereof cut out in the bottom to form flat springs engaging the plate, said plate having recesses for accommodating the ends of said spring when the jaws are moved towards one another, said spring normally parting said jaws, the sides of said channels at the free ends thereof forming prongs, and a pin extending from the plate between the jaws, and a head from said pin above the plate.

PAUL GLAMZO.